(12) United States Patent
Zahradnik

(10) Patent No.: US 7,741,561 B2
(45) Date of Patent: Jun. 22, 2010

(54) ELECTROSMOG SHIELDING FOR CABLE CONDUIT

(76) Inventor: Anton Zahradnik, Favoritenstrasse 62/16, A-1040 Vienna (AT)

(*) Notice: Subject to any disclaimer, the term of this patent is extended or adjusted under 35 U.S.C. 154(b) by 0 days.

(21) Appl. No.: 12/173,950

(22) Filed: Jul. 16, 2008

(65) Prior Publication Data
US 2008/0271917 A1    Nov. 6, 2008

(30) Foreign Application Priority Data
Jan. 18, 2006 (AT) .................................. A 72/2006
Jan. 17, 2007 (WO) ............... PCT/AT2007/000013

(51) Int. Cl.
H01B 11/06 (2006.01)
(52) U.S. Cl. ........................................................ 174/36
(58) Field of Classification Search ................ 174/36, 174/391, 113 R, 350
See application file for complete search history.

(56) References Cited

U.S. PATENT DOCUMENTS

| | | | |
|---|---|---|---|
| 5,406,762 A | | 4/1995 | Buard .................. 52/287.1 |
| 5,539,148 A | * | 7/1996 | Konishi et al. ............ 174/391 |
| 6,225,565 B1 | * | 5/2001 | Prysner ................. 174/120 SC |
| 6,416,830 B2 | | 7/2002 | Yoshida ..................... 428/34.5 |
| 7,135,643 B2 | * | 11/2006 | van Haaster et al. ........ 174/382 |
| 2004/0262021 A1 | * | 12/2004 | Leu .......................... 174/35 R |
| 2006/0151195 A1 | * | 7/2006 | Donazzi et al. ......... 174/110 R |

FOREIGN PATENT DOCUMENTS

| | | |
|---|---|---|
| AT | 503205 | 8/2007 |
| EP | 0330082 | 8/1989 |
| JP | 2004193222 | 7/2004 |
| JP | 2005065427 | 3/2005 |
| WO | WO 2005/013450 * | 2/2005 |

OTHER PUBLICATIONS

"Electromagnetic fields and public health" World Health Organization Fact sheet 322, Jun. 2007.
"ELF Environmental Health Criteria" Chapter 1, paragraph 1.1.12 pp. 13 and 14. Undated.

* cited by examiner

*Primary Examiner*—Chau N Nguyen
(74) *Attorney, Agent, or Firm*—Andrew Wilford

(57) ABSTRACT

In combination with a alternating-current-carrying electric power cables and a guide holding the cable. The guide is constructed such that electrical or magnetic radiation emitted by the cable can pass through the guide, an electrosmog shield has a channel formed of a material capable of blocking low-frequency electrical and magnetic radiation and dimensioned to fit with the conduit.

5 Claims, 3 Drawing Sheets

ELECTROSMOG SHIELDING FOR CABLE CONDUIT

CROSS REFERENCE TO RELATED APPLICATION

This application is a continuation-in-part of copending PCT application PCT/AT/207/000013 filed Jan. 17, 2007 and published Jul. 26, 2007 with a claim to the priority of Austrian patent application A 72/2006 itself filed Jan. 18, 2006.

FIELD OF THE INVENTION

The present invention relates to electrosmog shielding. More particularly this invention concerns such shielding used for electrical power cables held in guides or conduits.

BACKGROUND OF THE INVENTION

Standard electrical lines carrying alternating-current electricity in the 220V-400V range emit radiation known as electrosmog that is alleged to be unhealthy. In order to avoid the emission of electrosmog by cables and to keep it from the environment, this emission should be shielded in or on these cable ducts, especially adjustably and adapted to the local demand and in a manner making it easy to retrofit to existing wiring. According to the local needs on different positions of the conduit, different shielding strength are needed.

Electrosmog consists of electric and magnetic fields, originated by electric current in cable conduits, interfering with the environment. Electric fields do not spread themselves far and are easy to shield, however magnetic fields can have deleterious health effects at considerably greater distances.

Cable conduits or rather cable ducts for supplying electric power in buildings are manufactured either from plastic material or from steel or aluminum, for instance cable channels, pipes, hoses, channels. Such cable-guides, usually hold electric wires that are not shielded. These electrical conductors thus emit electrosmog for the following reasons:

1. Cable guides made from plastic do not shield electric and magnetic fields from current-carrying cables.
2. Cable guides made from sheet steel do not shield magnetic fields at a frequency at 50 or 60 Hertz, as is standard in common power supplies; instead only electric fields are shielded. Electrosmog emerges as magnetic fields.
3. Shielded cables for power supply in buildings are rarely installed in cable guides because of their wider diameter and higher costs.
4. In case of cable conduits of plastic or composite plastic material or rubber including shielding substances such as metal fibers, metal-powder, carbon-powder and the like, there is an attenuation of the emerging electrosmog, but at substantial high cost and considerable material thicknesses only.
5. Cable conduits consisting of plastic in composite construction with shielding foils are expensive with cost and material; their shielding factor cannot be varied locally.

Cable conduits in buildings are placed in the wall usually in flexible or rigid tubes, on the wall in form of channels made of plastic, steel or aluminum, below the floor as channels made of plastic or steel and below the ceiling in tray systems.

Unlike electric fields which can be shielded by brickwork as well as by steel or other metals, magnetic fields at a frequency of 50 or 60 Hertz penetrate brickwork and steel as well as plastic material in all directions when the cables in the conduits are not themselves shielded.

Furthermore, the shielding effect of soft magnetic alloys or other alloys with similar features of high permeability are known. Soft magnetic alloys shield electric as well as magnetic fields that originate from current wiring through the whole frequency range. In the contrary steel and aluminum in fact shield electric fields; however show only low or no shielding property for magnetic fields below a frequency of 100 kHz.

According to the current state of the art the shielding factor of already laid or new cable conduit elements cannot be subsequently modified. In case additional shielding is needed, the shielding is not applied at the cable guides, but to the walls or at the appliances to be shielded. Therefore the exposure of humans at least in significant areas of the environment in general remains unhampered.

Standard cable conduits for power supply normally made from plastic or metal are laid along the wall, below the ceiling as well as below the floor. Depending on the mode of installation low frequency as well as high frequency electric and magnetic fields can propagate from these cable conduits and interfere with the environment. Just in buildings for offices, homes, hospitals etc. such cable-conduits are equipped with unshielded cables or wires below the floor, along the wall or below the ceiling. In hospitals with bedrooms as well as offices, cable-conduits in most cases are laid near the human body or in the level of head. Electrosmog therefore can reach and affect persons and appliances from many directions.

As the harmful influence of low frequency electrosmog in that scale for is contended, there is its long-term influence with respect to disorders of sensitivity at electro-sensible persons and damage to patients with implants such as cardiac pacemakers, nervous stimulators, implanted insulin-pumps or hearing aids etc. or their interference liability is evident.

The use of electric and electronic appliances in homes, offices, hospitals increases every year rapidly. People are overburdened by electrosmog, since the unavoidable electrosmog, from monitors, printers, scanners, electro-installations on desks or refrigerators, electric stoves, microwave ovens that add to the permanent electrosmog penetrating unshielded cable conduits.

Therefore not only the influence of single appliances counts on persons as shown in statistics, but also the sum total of all influencing fields, as well as their duration which with regard to electrosmog are emerging from cable guides in various rooms from all directions and which are lasting all the time.

OBJECTS OF THE INVENTION

It is therefore an object of the present invention to provide an improved electrosmog shielding for cable conduit.

Another object is the provision of such an improved electrosmog shielding for cable conduit that overcomes the above-given disadvantages, in particular that can be used with plastic or metal cable guides or conduits for electric lines carrying low-frequency (e.g. 50-60 Hz) electricity in the 110-400 V range A further object is to provide such shielding that can be retrofitted to existing cabling in guides or conduits and that can be exchanged or modified to meet changing needs.

SUMMARY OF THE INVENTION

In combination with a alternating-current-carrying electric power cables and a guide holding the cable. The guide is constructed such that electrical or magnetic radiation emitted by the cable can pass through the guide, an electrosmog shield has according to the invention a channel formed of a material capable of blocking low-frequency electrical and magnetic radiation and dimensioned to fit with the conduit.

By mounting the shields according to the invention, the shielding factor of new or already laid cable conduits can easy be modified and adapted to the specific need, especially old conduits without or with low shielding strength can easily and at low cost be refitted according to the present invention. The invention allows one to configure the strength of shielding of cable conduit elements variably, every time exchangeable and modifiable according to the local needs in the wiring system.

According to the shielding factor of the shields (depending on their material thickness and quality) in new, as well as in already laid cable conduit elements a shielding of low frequency as well as high frequency electric and magnetic fields should be modifiable, depending on local demands.

For this reason the task of this invention is to arrange the shielding of new cable conduits on different locations of the wiring system variably, as for instance in homes or on workplaces so that the exposure of persons and appliances is limited to the unavoidable sources in daily used appliances as well as to the unavoidable high frequency electrosmog originated from mobile phones, antennas, radio control units etc.

The invention not only relates to the shielding of new produced cable conduit components but makes it possible to refit and upgrade old and already laid cable conduits too. The invention allows the strength of shielding in different parts of the wiring system to be variable according to the local position, and is at any time exchangeable and adjustable according to local demand. First of all however is the advantage that after installation of the cable-conduit elements these units can be fitted variably effective shields with different shielding strength, modified to local demand, easily and at low cost.

Thus already laid or not yet laid cable-conduits of electric power supplies as cable channels etc. are fitted with electrosmog shields whose the shield strength is modifiable according to request, demand and location.

The shields channels for shielding electric and magnetic fields spreading from cable conduits containing electric current carrying conductors are prefabricated from bent and/or seamed and/or creased and/or creasable sheets and/or foils and/or laminates or laminated foils, nets, knitted fabrics, plastic-compounds or preformed foams of shielding matter such as soft magnetic-metal alloys, preferably those with high permeability or other materials with similar shielding characteristic, which with little material-thickness effect an optimal shielding of electric as well as magnetic fields can easily, quickly and at low cost be mounted to new or already laid cable guide elements or can be exchanged according to their shielding strength.

These shields or channels are mounted on cable guides and can be fitted with adhesive media and are exchangeable against other shields with other shielding factors in order to facilitate possible service and completion.

The shields according to the invention are applicable optional to their prefabricated measurements to different cable guide units of different kind, origin and quality. Depending on shielding requirements foils, laminates, metal sheets of different thickness and shielding strength can be utilized. In order to reach very high local strength several shields can be put on top of each other. The shields can be exchanged easily and quickly against those with other shielding characteristics. They are shaped as potential equalizers.

An upgrade of existing electro-installations or changing the shielding strength by exchanging the matching shields in the wiring system, on demand in certain local wiring areas too, with that method of shielding according to this invention, hence can be carried out quickly and without great effort.

The production of the shields according to the invention is performed under the consideration of measurements and profiles by cutting, stamping, folding, seaming, pressing, forming, bending, etc. from suitable and favored metal sheets, foils, nets, knitted fabric or laminates, prints, metal-varnishes, coatings or other carriers of shielding substances with respect to shielding factor, material thickness and other favored properties.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
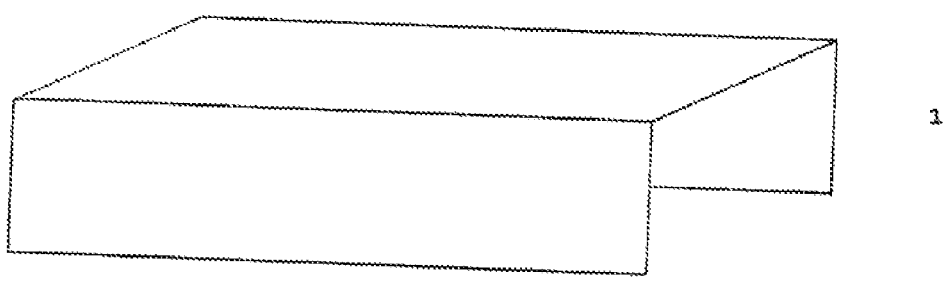
FIG. 1 is a perspective side view of a shield according to the invention.
Figure 2:
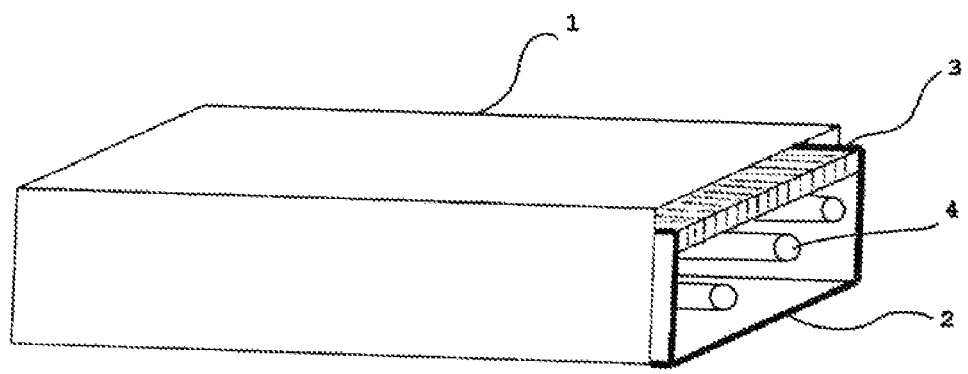
FIG. 2 is a view of the FIG. 1 shield applied to an existing rectangular-section conduit.
Figure 3:
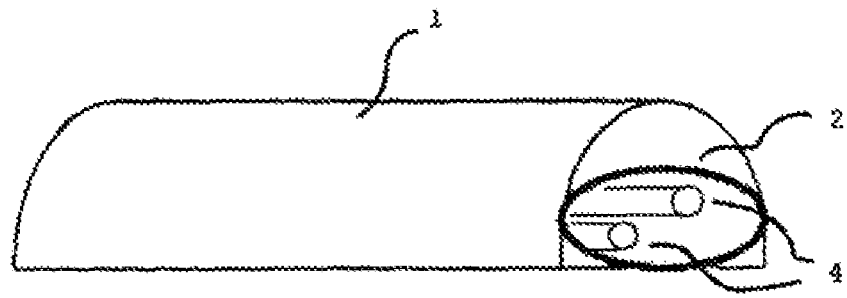
FIG. 3 is a view of a semicircular-section shield according to the invention applied to cabling in a elliptical-section guide.
Figure 4:
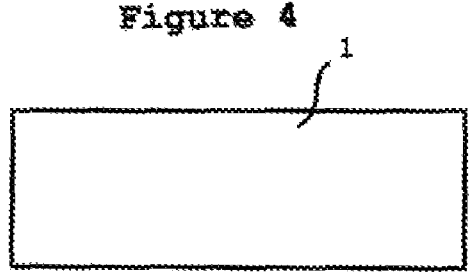
FIGS. 4 and 5 are side and end vies of the system of FIGS. 1 and 2.
Figure 5:
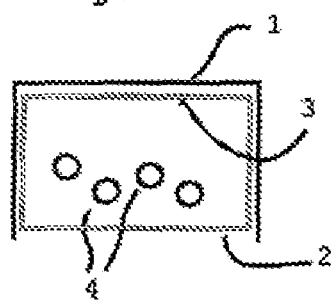
Figure 6:
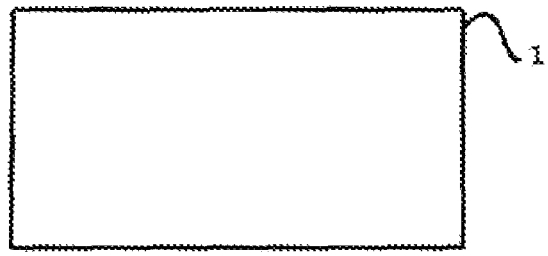
FIGS. 6 and 7 are side and end views of the system of FIG. 3.
Figure 7:
Figure 8:
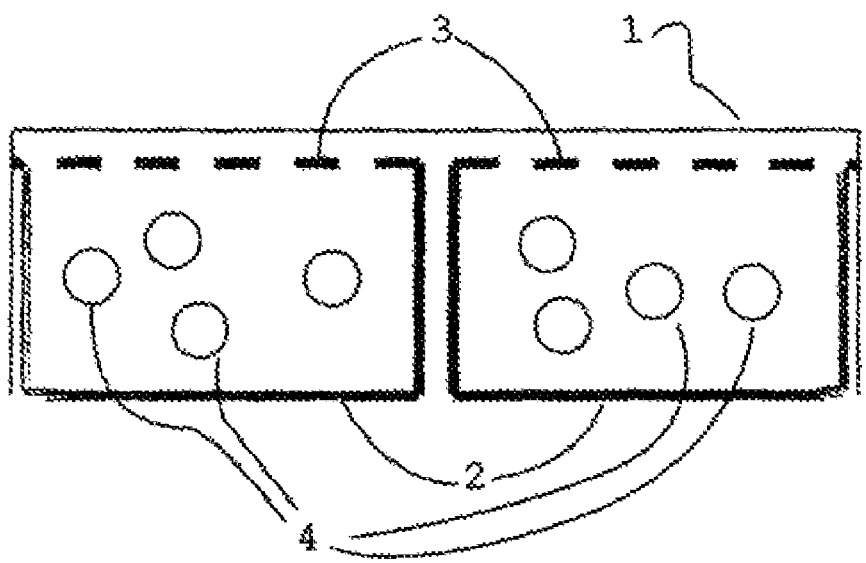
FIG. 8 is an end view of another system according to the invention.
Figure 9:
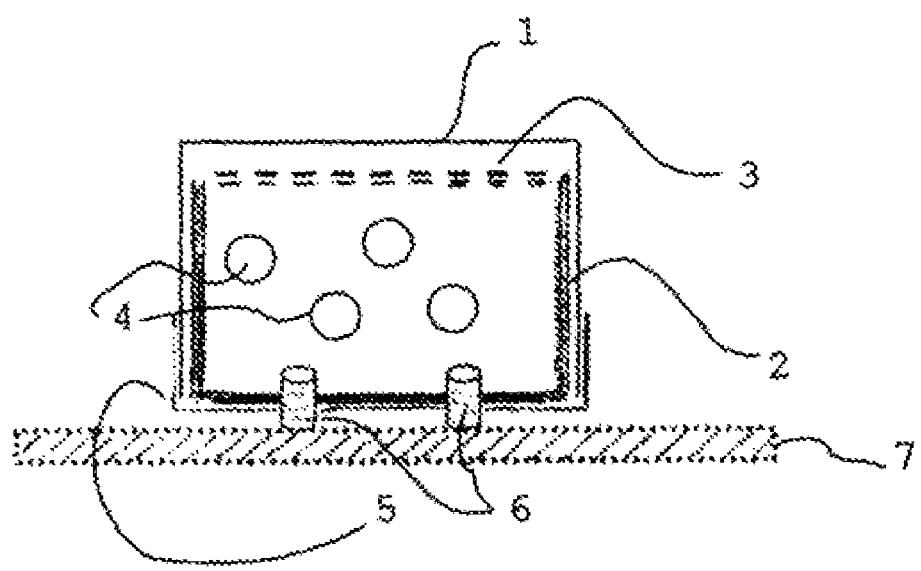
FIG. 9 is a sectional end view of a further system in accordance with the invention.

As seen in the drawing a shield, which in FIGS. 1, 2, 4, 5, 8, and 9 is formed of two planar and normally vertical leg panels and one planar and normally horizontal back panel, are employed to block electrical and magnetic radiation from cables 4. In FIGS. 2, 4, 5, 8, and 9 the cables 4 are held in an upwardly open rectangular-section channel 2 covered by a flat cap plate 3. In FIGS. 6 and 7 the cables 4 are held in an elliptical-section tube 2 that can be rigid or flexible. FIG. 9 shows how a second channel-shaped but upwardly open shield 5 can be fitted under the upper shield 2 and bolted to a floor 7 by screws 5 and 6.

I claim:

1. In combination with an alternating-current-carrying electric power cable and a guide holding the cable, an electrosmog shield comprising:
   two U-section channels formed of a material capable of blocking low-frequency electrical and magnetic fields, the channels being open toward each other and fully containing the guide and the cable therein.

2. The electrosmog shield defined in claim 1 wherein the channel is formed of one piece.

3. The electrosmog shield defined in claim 1 wherein the channel is formed of a soft magnetic alloy formed as a metal sheet, laminate, mesh, knit, felt foam, print, or plastic composite.

4. The electrosmog shield defined in claim 1 wherein the channel is shaped as a potential-equalization conductor.

5. In combination with alternating-current-carrying electric power cables and a plurality of guides holding the cables, an electrosmog shield comprising:
   a U-section channel formed of a material capable of blocking low-frequency electrical and magnetic fields and dimensioned to fit over the plurality of guides and the cables therein.

* * * * *